United States Patent [19]
Blaha

[11] 3,913,426
[45] Oct. 21, 1975

[54] INSULATED WIRE CUTTING AND STRIPPING MECHANISM HAVING DOUBLE KNOCK-OUT MEANS FOR WASTE MATERIAL

[75] Inventor: Gerald E. Blaha, Waukesha, Wis.

[73] Assignee: Artos Engineering Company, New Berlin, Wis.

[22] Filed: Dec. 23, 1974

[21] Appl. No.: 535,425

[52] U.S. Cl. ................................................ 81/9.51
[51] Int. Cl.² .......................................... H02B 1/12
[58] Field of Search ..................................... 81/9.51

[56] References Cited
UNITED STATES PATENTS

| | | | |
|---|---|---|---|
| 2,497,112 | 2/1970 | Andren | 81/9.51 |
| 2,718,802 | 9/1955 | Cook | 81/9.51 |
| 2,756,619 | 7/1956 | Scharf | 81/9.51 |
| 3,857,306 | 12/1974 | Gudmestad | 81/9.51 |

Primary Examiner—Al Lawrence Smith
Assistant Examiner—Roscoe V. Parker
Attorney, Agent, or Firm—James E. Nilles

[57] ABSTRACT

Mechanism for cutting insulated wire such as electrical wire and then stripping both ends of the cut wire adjacent the cut. The mechanism also has means for then positively removing the waste portions of the insulation from both the upper and lower stripping knives. The upper and lower knock-out fingers for the upper and lower stripping knives, respectively, are connected together by a resiliently loaded, telescoping mechanism. The insulated wire stock is held in a lengthwise fixed position by a pair of gripping jaws; the wire is then cut through by a pair of blade assemblies and simultaneously the insulation only is cut on either side of the main cut; the cut insulation is then stripped from the free end of one of the wires by movement of the blade assemblies and the cut insulation is stripped from the end of the other wire by movement of one pair of gripping jaws relative to the blade assemblies. The double knock-out means is then operative to wipe both of the cooperating insulation cutting blade assemblies free of the stripped insulation material.

5 Claims, 12 Drawing Figures

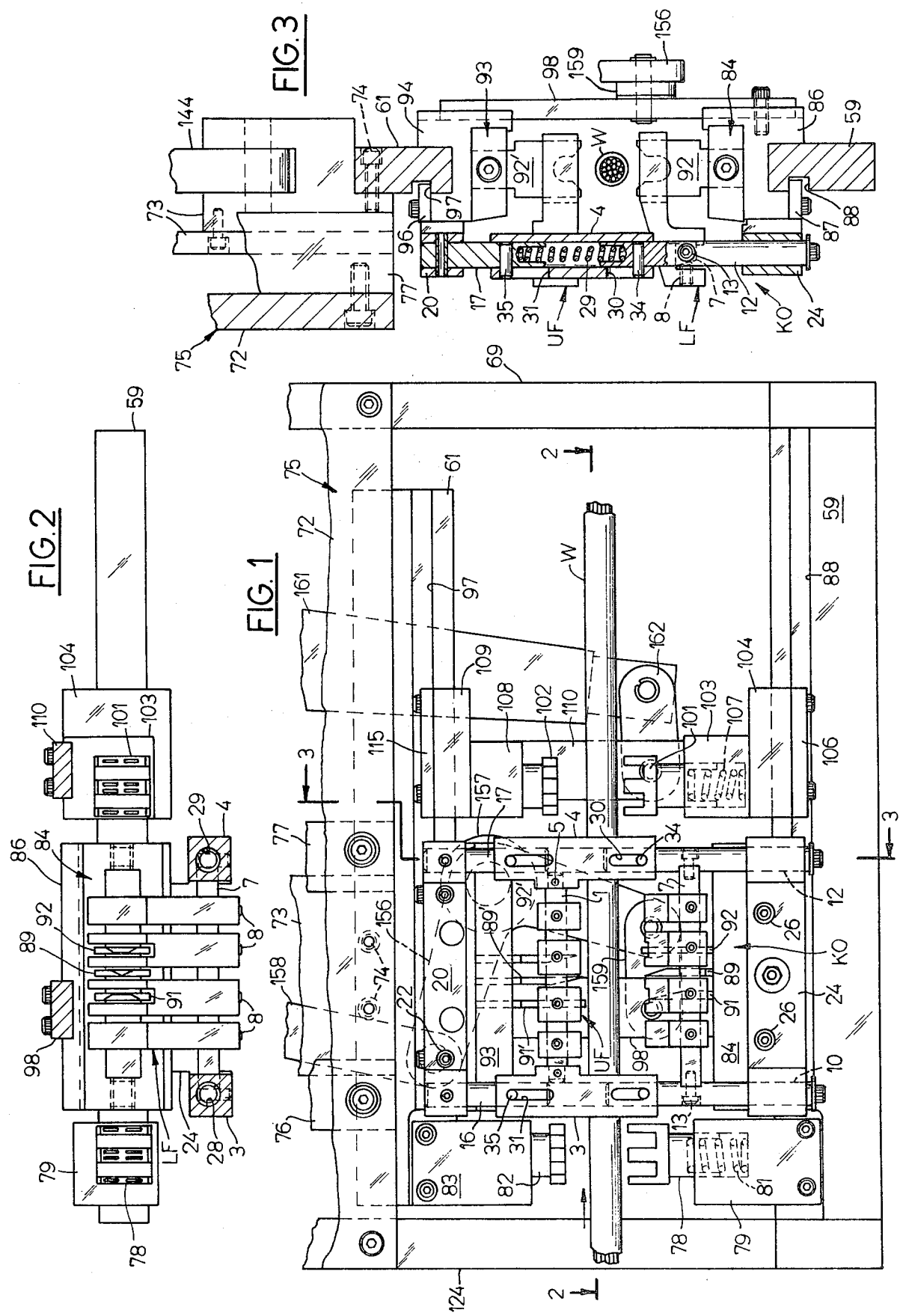

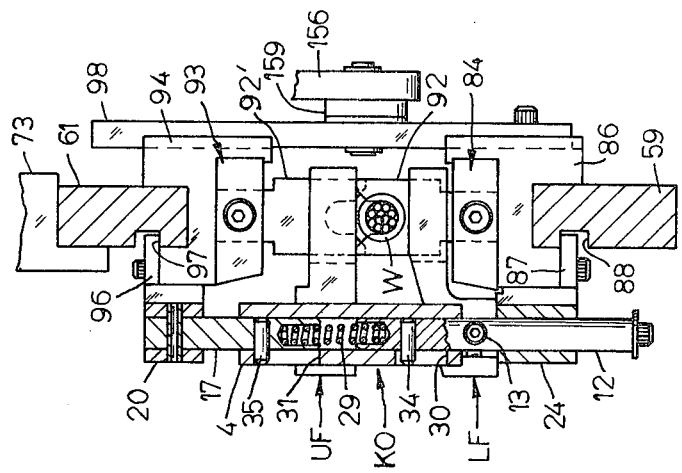
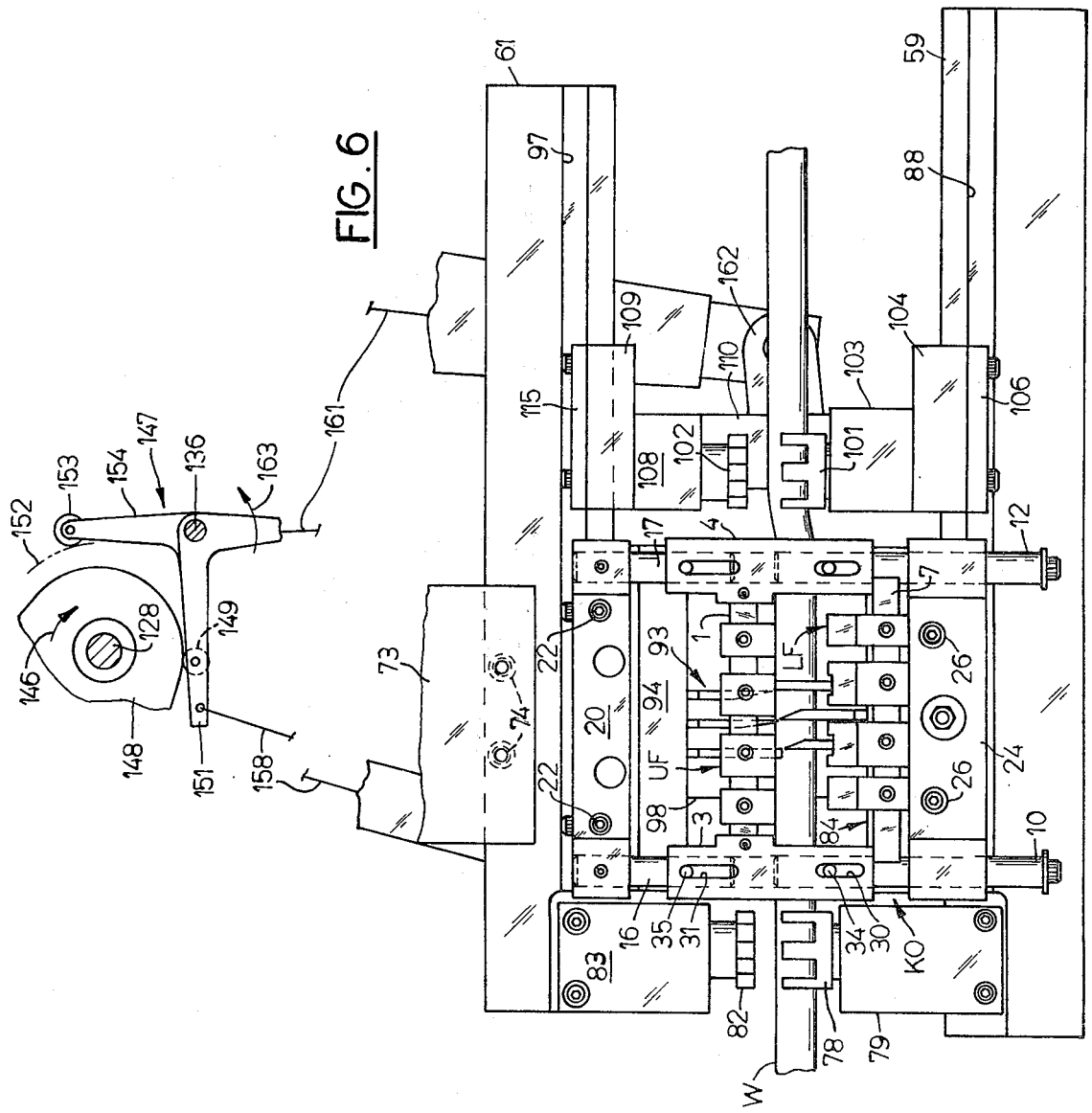

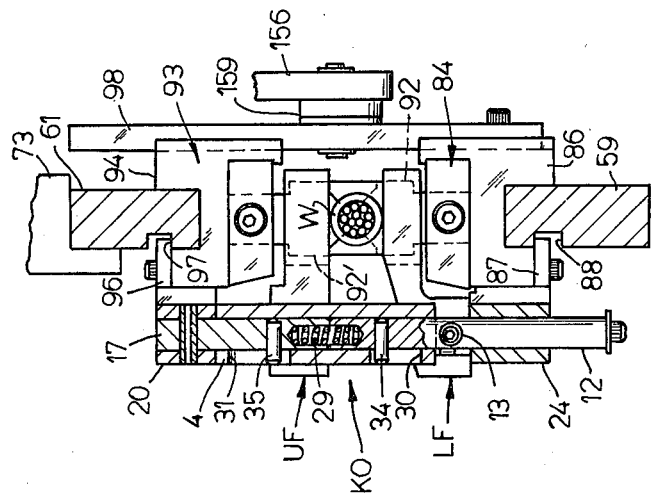
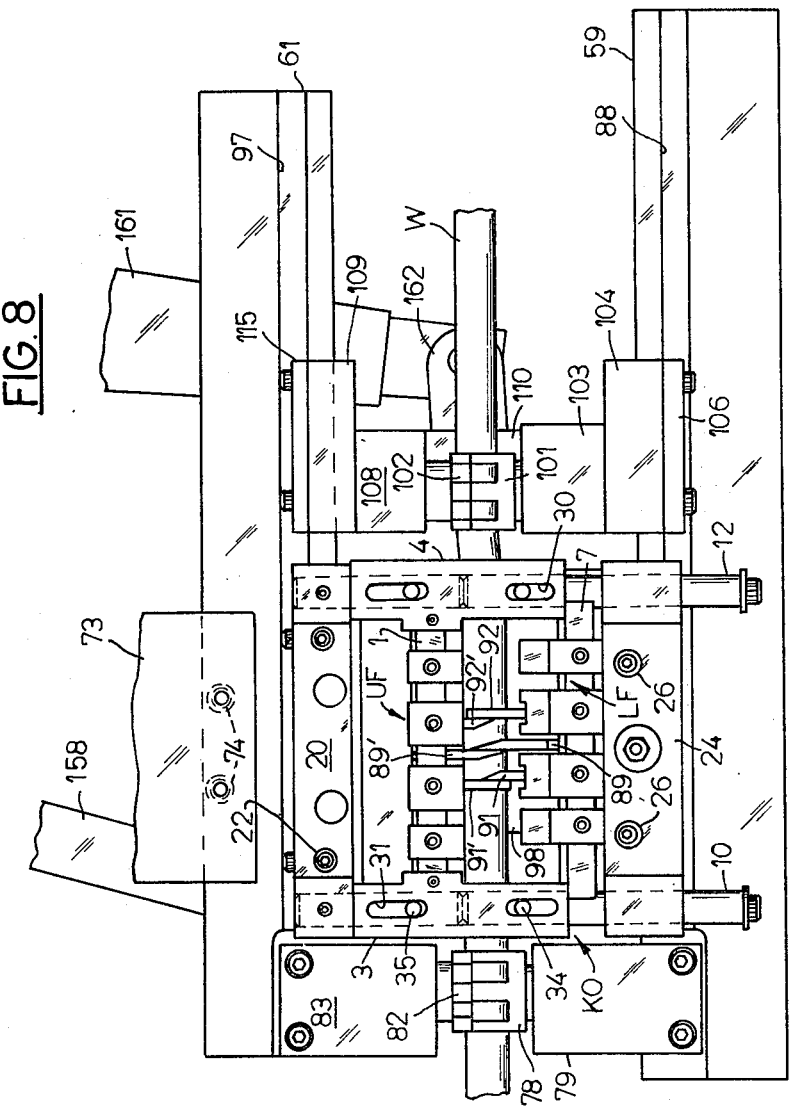

3,913,426

INSULATED WIRE CUTTING AND STRIPPING MECHANISM HAVING DOUBLE KNOCK-OUT MEANS FOR WASTE MATERIAL

BACKGROUND OF THE INVENTION

The invention pertains to cutting and stripping mechanism for insulated wire or the like in which the wire is cut completely and then both adjacent ends of the wire are stripped of the insulating material. Sometimes these short pieces of stripped insulation material become lodged or otherwise stuck in the oppositely moving, opposed stripping knives, or both become stuck in either the upper or lower blades.

One example of mechanism of this type is shown in the co-pending United States patent application Ser. No. 370,217, filed June 15, 1973 and entitled "Cable Cutting and Stripping Machine," issued as U.S. Pat. No. 3,857,306 on Dec. 31, 1974. That patent and the present application have been assigned to a common assignee.

SUMMARY OF THE INVENTION

The present invention provides an insulating wire cutting and stripping mechanism which first grips a length of wire, then cuts the wire and then simultaneously also cuts the insulation only on either side of the main cut, then strips the cut insulation from both, adjacent ends of the wire by relative movement of the insulation cutting knives relative to the wires, and then resiliently loaded knock-out means act to wipe both of the opposed stripping knives free of the short lengths of insulated waste material.

With the present invention, both of the opposed and cooperating insulation cutting knives are positively cleared of waste material at the end of the wire cutting and stripping cycle, thereby insuring proper operation of the mechanism for the successive cycle.

These and other objects and advantages of the present invention will appear hereinafter as this disclosure progresses, reference being had to the accompanying drawings.

BRIEF DESCRIPTION OF THE DRAWINGS

FIG. 1 is a front, elevational view of a cutting and stripping mechanism made in accordance with the present invention and showing the wire to be cut and stripped in place;

FIG. 2 is a sectional view taken generally along the line 2—2 in FIG. 1;

FIG. 3 is a vertical sectional view taken generally along the line 3—3 in FIG. 1;

FIG. 6 is a view similar to FIGS. 1 and 4 but furthermore showing the upper knock-out assembly when it has pushed the wire down into the lower cutting and stripping mechanism;

FIG. 7 is a view similar to FIGS. 3 and 5, but showing the parts removed to the positions shown in FIG. 6;

FIG. 8 is a view similar to FIGS. 1, 4 and 6, but showing the mechanism when completely closed and after it has effected the cut of the wire;

FIG. 9 is a view similar to FIGS. 3, 5 and 7, but showing the parts when in the position occupied in FIG. 8;

DESCRIPTION OF A PREFERRED EMBODIMENT

Figure 5:
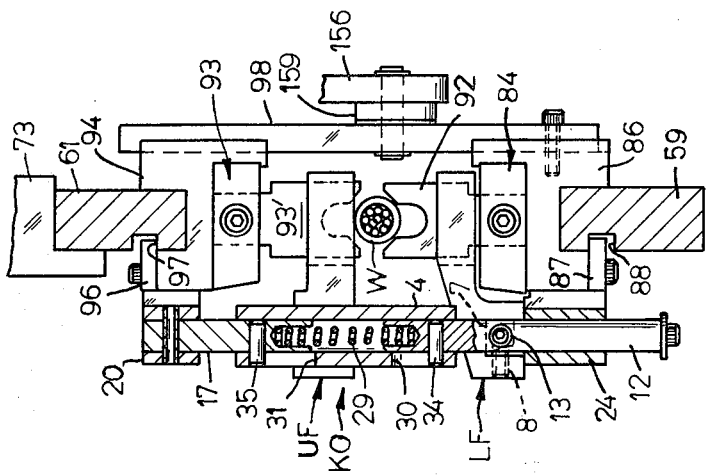
FIG. 5 is a view similar to FIG. 3, and showing the parts in positions corresponding to FIG. 4, certain parts being shown as broken away from the sake of clarity.

The present invention is an improvement over the machine shown in said United States patent 3,857,306 and only as much of the main machine will be shown and described in the present application as is thought necessary to fully describe and claim the improved waste insulation removing, double knock-out means for both the upper and lower stripper knives.

The general organization of the mechanism of the present invention includes two pairs of opposed jaws 78, 82 and 101, 102 which act to hold the insulated wire W after it has been inserted in the mechanism by a conventional delivery means (not shown). Upper jaws 82 and 102 are mounted on a vertically reciprocable tool support 61. After the wire has been securely gripped, a pair of relative moving and opposed wire and insulation cutting blade assemblies 84, 93 are actuated to completely sever the wire and simultaneously also cut the insulation only on each side of the cut joint. One of the pairs of jaws, the gripping jaws 101, 102, is then shifted (horizontally as shown in the drawings) relative to the stripping knives and generally along the axis of the wire; at the same time, the knives are also shifted in the same direction but to a lesser extent; this shifting of the parts causes the waste insulation material M and M' to be stripped from both of the adjacent ends of the wire. The knives are then moved (vertically as shown in the drawings) away from the wire and relative to one another. Sometimes the waste insulated material which has been stripped from the wire ends is lodged in either the upper or lower stripping knives, or in both upper and lower knives.

The timing of the downard movement of the upper tool support 61 and its associated parts is synchronized by movement of the knock-out meeans KO, the latter being actuated by movement of the upper tool support.

The said U.S. Pat. No. 3,857,306 taught the use of a single knock-out means for clearing the lower blade assemblies.

The insulated wire knock-out fingers UF and LF provided by the present invention comprise upper and lower knock-out fingers for wiping the upper and lower stripping knives, respectively, of waste material. The upper and lower knock-out fingers are connected together by a resilient, lost motion connection to cause them to move in an orderly progression with and relative to the stripping knives in both the cutting and release directions.

The vertical movement of the upper and lower knock-out fingers is correlated with the vertical movement of the upper tool support and its associated wire clamping and gripping means.

A more detailed description of the mechanism will now be referred to.

Knock-Out Mechanism

Figure 12:
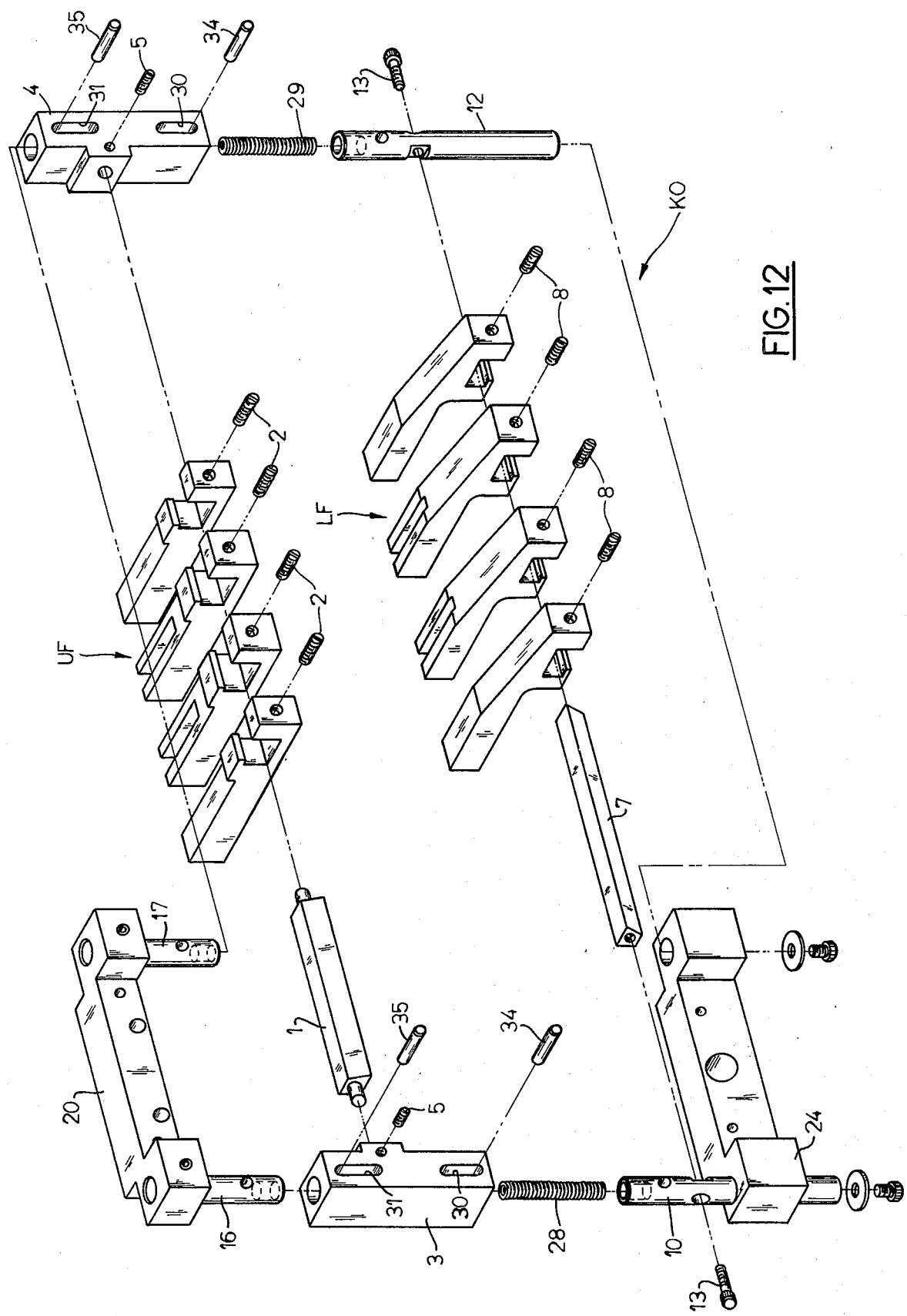
FIG. 12 is an exploded, isometric view and showing the upper and lower knock-out assembly as shown in the other views.

The knock-out means KO for cut insulation waste material is shown in perspective, exploded view in FIG. 12 as well as in various operating positions in the other figures.

The knock-out means includes a series of upper fingers UF rigidly mounted on a support bar 1 by the screws 2, which bar in turn is rigidly fixed at each of its ends to the vertical guides 3 and 4 by means of screws 5. The knock-out means also includes a series of lower fingers LF which are similarly rigidly secured to the support bar 7 by their respective screws 8, and the bar 7 in turn is rigidly fixed at each of its ends to vertical shafts 10 and 12 by means of the cap screws 13. The upper finger assembly including the fingers and the vertical guides are shiftably mounted in a vertical direction on the stub shafts 16 and 17 slideably engaged in the vertical holes of their respective vertical guides 3 and 4. The stub shafts 16 and 17 are in turn fixed to and depend from an upper mounting bar 20. The upper mounting bar 20 as shown in FIG. 3 is secured by screws 22 to the upper tool support 61.

The lower finger assembly is vertically shiftable in a lower mounting bar 24 by means of the shafts 10 and 12 which slideably extend through vertical holes in the bar 24. The bar 24 is in turn fixed to the lower tool support (FIG. 1) by the cap screws 26. Springs 28 and 29 are located, respectively, in the vertical guides 3 and 4 and the ends of the springs nest within their respective shafts 10, 16 and 12, 17. The vertical guide members 3 and 4 each have a pair of vertical slots 30, 31 therein and which receive, respectively, the pins 34 and 35 that in turn are fixed to and extend from the vertical shafts 10 and 16. These pin and slot connections provide a lost motion connection between upper and lower knife assemblies within predetermined limits.

As shown in FIG. 3, the knife assemblies are in their inoperative position away from the wire W and their knife assemblies are also in a position away from the wire W. This is accomplished because the springs act against the upper vertical shafts 16 and 17 and against the lower shafts 10 and 12 and consequently move the associated lower knife assembly to a position away from the wire W. By urging the vertical shafts apart, the spring also urges the vertical guides 3 and 4, to which the upper fingers are attached, to the upper position shown.

As shown in FIG. 5, the upper tool support 61 has been moved to a downward position by the linkage and cam connection and this causes the upper posts 16 and 17 to move downwardly. This due to the stiffness of the springs, causes the lower finger assembly to move to its lowermost position against the lower mounting bar 24. This has also caused the upper knife assembly and its associated fingers to move downward directly over the wire and center the wire above the lower blades.

As shown in FIG. 7, the continued downward movement of the upper tool support, the upper knife assembly, and the upper fingers have caused the wire W to be pushed into the lower knife assembly.

Figure 10:
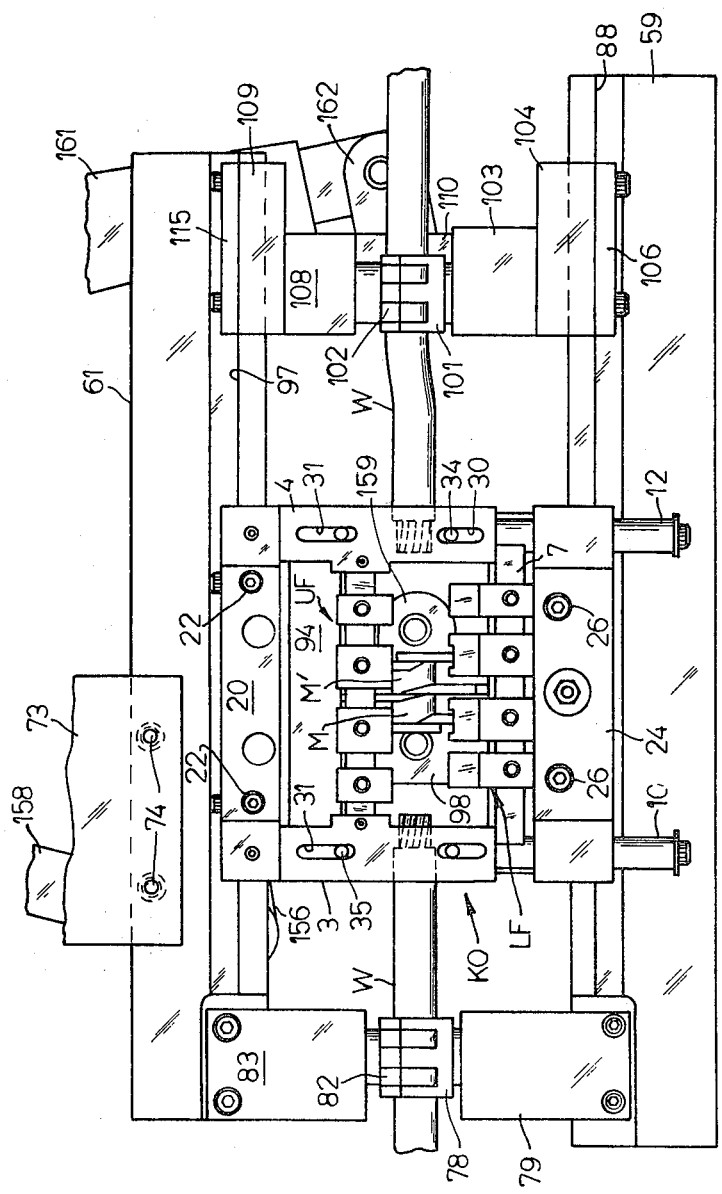
FIG. 10 is a view similar to FIGS. 1, 4, 6 and 8, but showing the arrangement when the cut-off wire has been pulled axially from the mechanism and wherein the insulation material that has been severed is still in the cutting mechanism.

As shown in FIG. 9, continued downward movement of the upper tool support, the upper knife assembly and the upper fingers, causes the upper knives to also engage the wire and thus perform the cutting function. In other words, the wire has now been severed by the central knives and the insulation on each side of the cut wire has also been severed by the insulation cutting knives. It will furthermore be noted that the lower ends of the upper shafts 16 and 17 have come to abut against the upper ends of the lower shafts 10 and 12. As shown in FIG. 10, one piece of waste material M is caught between the blades of the upper assembly and the other piece of waste material M' is caught between the blades of the lower assembly.

Figure 11:
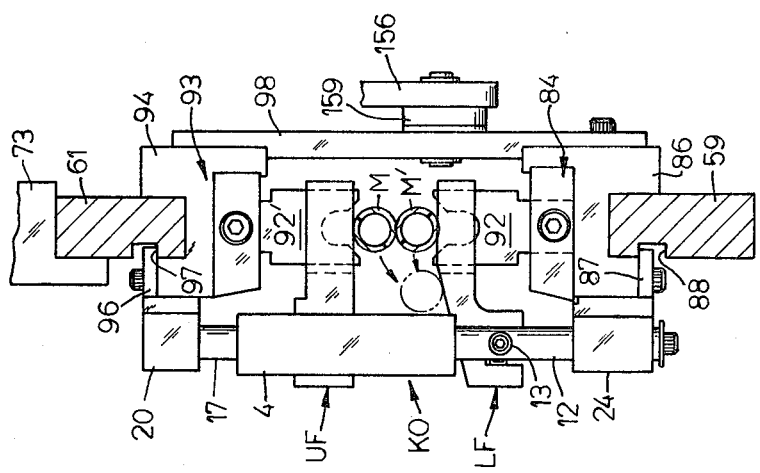
FIG. 11 is a vertical sectional view taken along the line 11—11 in FIG. 10, but showing the upper and lower cutting and stripping mechanism when they have been moved away from one another so as to free the insulation covering so that it can be knocked-out.

FIG. 11 shows the knife assembly, knock-out arrangement when the upper tool support has been raised to separate the knife assemblies, to the original FIG. 3 position. The upper tool support has carried with it, through the upper pin and slot connection, the vertical guides 3 and 4. The knife assemblies have moved vertically between the bifurcated free ends of the fingers of the finger assemblies, that is, from a position shown in FIG. 9 to the position shown in FIG. 11, thereby forcing the insulation waste material M and M' out from between the coresponding knife assemblies. The material then falls free, and is blown out of the machine with a blast of air to assure a clean mechanism for the next operation.

Wire Stock Clamping Means

As described in said U.S. Pat. No. 3,857,306, a lower tool supporting rail 59 and an upper tool supporting rail 61 are operatively mounted on the machine frame in reciprocable relation to each other.

The upper tool supporting rail 61 is slideably mounted for up and down movement on a vertical wall member 72 (FIG. 3) of a housing assembly 75, the housing assembly having side walls 124 and 69 (FIG. 1). A slide block 73 at the inner side of the wall member 72, is connected to the rail 61 by screws 74 and guided on the wall member 72 by gibs 76 and 77 (FIG. 1). At the end of the lower tool supporting rail 59, a wire clamping jaw 78 is positioned in a socket member 79 on the rail 59. A coil spring 81 within the socket member 79 resiliently supports the clamping jaw 78 in a vertical position. A complementary clamping jaw 82 opposite to the clamping jaw 78 is seated in an adjustable socket member 83 on the upper rail 61.

FIG. 1 shows the clamping jaws 78 and 82 in an open position from which they can be moved into a closed stock engaging position as shown in FIGS. 8 and 10 by means of a cam controlled linkage mechanism which will be explained more fully later.

A lower cutting blade assembly 84 is slideably mounted on the lower tool supporting rail 59 for back and forth movement in a horizontal direction. As shown in FIGS. 1, 2 and 3, the blade assembly 84 comprises a blade mounting structure 86 which straddles the rail 59 and is provided at its lower end with a tongue 87 in cooperative engagement with a longitudinal groove 88 in the rail 59. Fixedly secured in the blade mounting structure 86 are three laterally spaced cutting blades 89, 91 and 92, the blade 89 being a wire cutting blade and the blades 91 and 92 being insulation cutting blades.

An upper cutting blade assembly 93 opposite and complementary to the lower cutting blade assembly 84 is mounted on the upper tool supporting rail 61 for horizontal back and forth shifting movement. As shown in FIG. 3, the upper blade assembly 93 has a blade mounting structure 94 which is connected to the rail 61 in a depending position by means of a tongue 96 in cooperative engagement with a longitudinal groove 97 in the rail 61. Like the lower blade assembly 84, the upper blade assembly 93 has three cutting blades 89', 91' and 92' which are fixedly retained in the mounting structure 94 in laterally spaced relation to each other. As shown in FIGS. 1 and 6, the lower blade assembly 84 and the upper blade assembly 93 are tied together for unitary back and forth movement along the rails 59 and 61 by means of a connecting bar 98 which is rigidly secured to the blade mounting structure 86 of the blade assembly 84 and which extends through a vertical recess in the blade mounting structure 94 of the assembly 93 in up and down movable relation thereto.

FIG. 3 shows the lower and upper blade assemblies 84 and 93 in an open condition from which they are moved into the closed position shown in FIGS. 9 and 10 by translatory downward movement of the rail 61 towards the rail 59. Unitary horizontal back and forth shifting of the upper and lower blade assemblies 84 and 93 along the rails 61 and 59 is accomplished by means of cam controlled link mechanism to be described later.

The Cut Wire Gripping Means

In addition to the wire stock clamping jaws 78 and 82, and the wire cutting assemblies 84 and 93, the tool supporting rails 59 and 61 mount a pair of horizontally back and forth shiftable cut wire gripping jaws 101 and 102. The lower gripping jaw 101 is seated in a socket 103 which is connected to a slide block 104 as shown in FIG. 1. The slide block 104 has a tongue plate 106 like the tongue plate 87 of the cutting blade assembly 84 in cooperative engagement with the groove 88 of the rail 59. The lower gripping jaw 101 is resiliently supported by a coil spring 107 in a vertical position within the socket 103.

The upper gripping jaw 102 is adjustably mounted in socket 108, which provides for vertical up and down adjustment of the jaw 102 relative to the socket 108, is connected to a slide block 109 of the upper rail 61 by a tongue 115.

Figure 4:
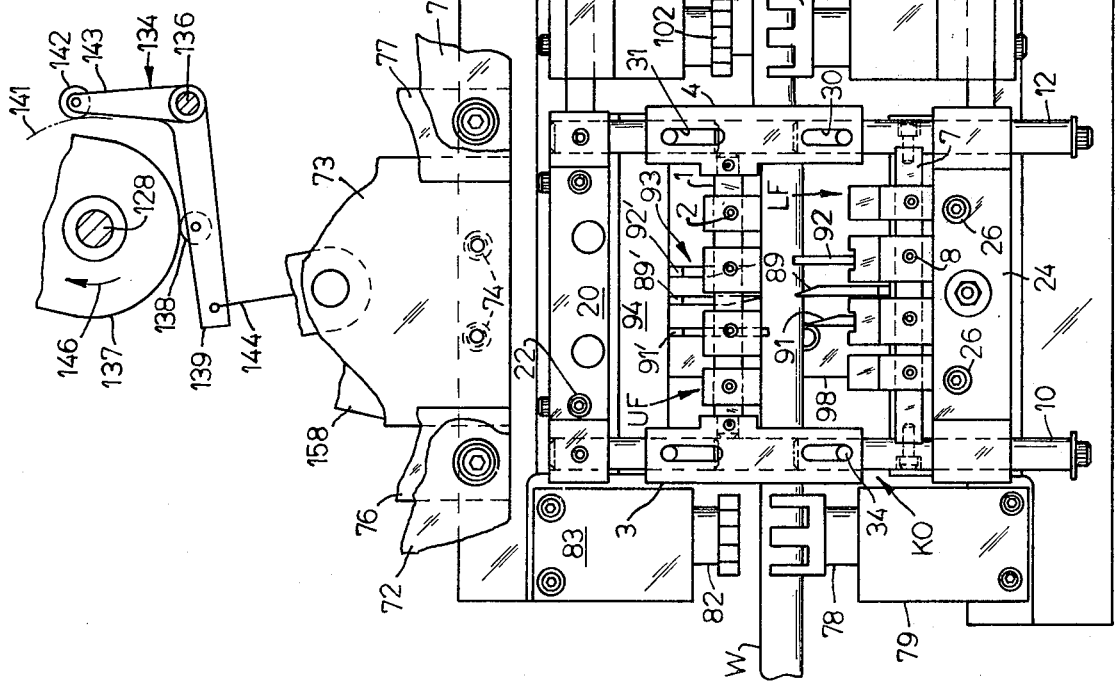
FIG. 4 is a view similar to FIG. 1, but showing the upper knock-out members after they have been lowered into contact with the wire and the wire has been placed in the lower cutter and stripper blades.

Like the cutting assemblies 84 and 93, the gripping jaws 101 and 102 are tied together for unitary back and forth movement along the supporting rails 59 and 61. For that purpose, a connecting bar 110 is secured at its lower end to the slide block 104 and has a vertical sliding connection with the slide block 109 on the upper rail 61. Downward movement of the upper rail 61 from the position shown in FIGS. 1, 4 and 6 to the lower position in which it is shown in FIGS. 8 and 10 brings the gripping jaws into engagement with the wire stock which has been played out by the wire feeding device (not shown).

A cam operated linkage mechanism for reciprocating the gripping jaws 101 and 102 longitudinally of the rails 59 and 61 relative to the cutting assemblies 84 and 93 is operatively connected to the connecting bar 110 as will be described here.

The Cam Actuated Linkage Mechanism

The mechanism for moving the upper tool supporting rail 61 up and down as well as the mechanism for reciprocating the cutting knife assemblies 84 and 93 and the gripping jaws 101 and 102 are operated by rotation of a cam shaft 128 (FIG. 4) which is rotatably supported at its opposite ends on the wall member 72 and on a back wall of the housing assembly 75.

The cam operated linkage mechanism (FIG. 4) for moving the tool supporting rail 61 up and down relative to the tool supporting rail 59 comprises a rocker arm assembly 134 (shown schematically in FIG. 4) which is pivotally mounted on a cross shaft 136 between the housing wall 72 and back wall of housing assembly 75. An actuating cam 137 on the cam shaft 128 cooperates with a cam follower roller 138 which is pivotally supported between a pair of radial arms 139 of the rocker assembly 134. Another cam disc 141 which is rotated in unison with the cam disc 137 by the cam shaft 128 cooperates with a cam follower roller 142 between a pair of radial arms 143 of the rocker assembly 134. The cam discs 137 and 141 are properly contoured so that the rollers 138 and 142 will remain continuously in contact with the cam discs during rotation of the cam shaft 128. The vertical slide block 73 which is secured to the upper tool supporting rail 61 is connected to the radial arms 139 of the rocker arm assembly 134 by a link 44. FIG. 2 shows the tool supporting rail 61 in its raised limit position and rotation of the cam shaft 128 in the direction of arros 146 (FIG. 4) through one revolution will sequentially lower the rail 61 to its lowered limit position and then raise it again to its upper limit position.

The cam operated linkage mechanism for reciprocating the cutting blade assemblies 84 and 93 and the gripping jaws 101 and 102 back and forth along the tool supporting rails 59 and 61 is shown schematically in FIG. 6. It comprises a rocker arm assembly 147 which is pivotally mounted on the cross shaft 136 next to the rocker arm assembly 134. A cam disc 148 on the cam shaft 128 cooperates with a cam follower roller 149 between a pair of radial arms 151 of the rocker arm assembly 147. Another cam disc 152, which is rotated in unison with the cam disc 148 by the cam shaft 128 cooperates with a cam follower roller 153 between a pair of arms 154 of the rocker arm assembly 147. The cam discs 148 and 152 are suitably contoured so that the cam follower rollers 149 and 153 will stay continuously in contact therewith during a complete revolution of the cam shaft 128 and swing the rocker arm assembly 147 back and forth about the axis of the cross shaft 138.

A bell crank lever 156 is pivotally mounted on a cylindrical stud 157 (FIG. 1) which extends inwardly from the rear wall of housing assembly 75. One arm of the bell crank lever 156 is connected to the radial arms 151 of the rocker arm assembly 147 by means of a link 158 and the other arm of the bell crank lever 156 is connected to the connecting bar 98 between the upper and lower cutting blade assemblies 93 and 84 by a link 159. As the rocker arm assembly 147 swings back and forth about the axis of the cross shaft 136, the connecting bar 98, and with it the upper and lower cutting blade assemblies 93 and 84, will therefore be shifted back and forth a predetermined distance along the lower and upper tool supporting rails 59 and 61.

The rocker arm assembly 147 has a pair of depending arms 161 which at their lower ends are hingedly connected to the connecting bar 110 between the lower and upper gripping jaws 101 and 102 by means of a link 162. When the rocker arm assembly 147 swings back and forth about the axis of the cross shaft 136, such swinging movement will therefore not only reciprocate the cutting blade assemblies along the tool supporting rails 59 and 61, but it will also reciprocate the gripping jaws 101 and 102 along the rails 59 and 61. However, the geometry of the linkage is such that the distance through which the gripping jaws are moved back and forth along the rails 59 and 61 is about twice as long as the distance through which the cutting blade assemblies are moved back and forth during the swinging movement of the rocker arm assembly 147.

In the condition of the mechanism in which it is shown in FIGS. 8 and 10, the cutting blade assemblies 84 and 93 are located in proximity to the clamping jaws 78 and 82, and the gripping jaws 101 and 102 are located in proximity to the cutting blade assemblies 84 and 93. As the cam shaft 128 rotates in the direction of arrow 146 in FIG. 6, the rocker arm assembly 147 will, after some delay, start swinging in the direction of arrow 163, and the cutting blade assemblies 84 and 93 will move away from the clamping jaws 78 and 82. At the same time, that is, while the cutting blade assemblies 84, 93 are receding from the clamping jaws 78, 82, the gripping jaws 101 and 102 will move away from the cutting assemblies 84 and 93. FIG. 10 shows the cutting blade assemblies 84 and 93 at their maximum spacing from the clamping jaws 78 and 82 and the gripping jaws 101 and 102 are shown at their maximum spacing from the cutting blade assemblies 84 and 93. Continued rotation of the cam shaft 128 in the direction of the arrow 146 (FIGS. 4 and 6) will return the cutting blade assemblies 84 and 93 and the gripping jaws 101 and 102 to the starting position in which they are shown in FIG. 1.

I claim:

1. An insulated wire cutting and stripping mechanism comprising a support frame, a stationary tool support and a reciprocable tool support, both supports operatively mounted on said frame and in opposed relation to each other; a pair of relatively opposed wire clamping jaws mounted, respectively, on said tool supports; a pair of relatively opposed wire and insulation cutting blade assemblies mounted, respectively, on said tool supports in laterally shiftable relation to said clamping jaws; a pair of relatively opposed cut wire gripping jaws mounted, respectively on said tool supports in laterally shiftable relation to said cutting blade assemblies, and cut insulation waste knock-out means operatively associated with both of the tool supports and opposed cutting blade assemblies for removing cut insulation waste material from their respective cutting blade assembly, said knock-out means comprising fingers mounted on their respective tool support for shifting relative to their respective blade assembly, and means connected between and for resiliently urging the fingers of said opposed knife assemblies away from one another, and said blade assemblies move relative to their respective fingers to thereby cause said fingers to remove cut insulation waste material from their blade assemblies.

2. The mechanism set forth in claim 1 further characterized in that said means connected between the fingers of opposed knife assemblies comprises a telescoping member having a spring for urging said member to an extended position.

3. The mechanism set forth in claim 2 further characterized in that said telescoping member includes a lost motion connection between the fingers and said telescoping member.

4. The mechanism set forth in claim 3 further characterized in that said telescoping member is slideably mounted at one end of said stationary tool support and is fixed at the other end to said reciprocable tool support.

5. Insulated wire cutting and stripping mechanism comprising a stationary tool support and a reciprocable tool support mounted in opposed relation to each other; relatively opposed wire clamping jaws mounted on said tool supports; relatively opposed wire and insulation cutting blade assemblies mounted, respectively, on said tool supports for relative movement between said blade assemblies between a wire cutting position and a wire releasing position, and knock-out means operatively associated with both of the tool supports and opposed cutting blade assemblies for removing cut insulation waste material from their respective cutting blade assembly, said knock-out means comprising fingers mounted on their respective tool support for shifting relative to their respective blade assembly, and means connected between and for urging the fingers of said opposed knife assemblies to move relative to one another, and said blade assemblies move with their respective support and relative to their respective fingers to thereby cause said fingers to remove cut insulation waste material from their blade assemblies.

* * * * *